United States Patent [19]

Tagawa

[11] Patent Number: 5,094,120

[45] Date of Patent: Mar. 10, 1992

[54] BICYCLE SPEED CHANGE LEVER ASSEMBLY

[75] Inventor: Koichi Tagawa, Kawachinagano, Japan

[73] Assignee: Maeda Industries, Ltd., Osaka, Japan

[21] Appl. No.: 523,549

[22] Filed: May 15, 1990

[30] Foreign Application Priority Data

Jun. 26, 1989 [JP] Japan .................. 1-75237[U]

[51] Int. Cl.⁵ .................. B62M 25/04; G05G 9/00
[52] U.S. Cl. .................. 74/475; 74/489; 74/502.2; 74/141.5
[58] Field of Search .............. 74/502.2, 489, 475, 74/526, 141.5

[56] References Cited

U.S. PATENT DOCUMENTS

| | | | |
|---|---|---|---|
| 3,941,008 | 3/1976 | Cambria | 74/475 |
| 4,532,825 | 8/1985 | Nagano | 74/502.2 X |
| 4,658,667 | 4/1987 | Schuller | 74/502.2 X |
| 4,850,241 | 7/1989 | Buckley et al. | 74/502.2 |
| 4,864,885 | 9/1989 | Nagano | 74/502.2 |
| 4,936,160 | 6/1990 | Barnard et al. | 74/489 X |

FOREIGN PATENT DOCUMENTS 0923644 7/1949 Fed. Rep. of Germany .
55-20909 6/1980 Japan .
59-43191 12/1984 Japan .
60-149485 10/1985 Japan .

*Primary Examiner*—Allan D. Herrmann
*Assistant Examiner*—Winnie Yip
*Attorney, Agent, or Firm*—William H. Eilberg

[57] ABSTRACT

The present invention provides a bicycle speed change lever assembly comprising a first lever pivotally pressed to wind up a control cable. aginst a tension applied thereto, and a second lever pivotally pressed to pivotally return the first lever for paying out the control cable. The lever assembly further comprises an indexing mechanism provided between the first and second levers for holding the first lever at a selected one of stepwise pivotal positions against the cable tension. The indexing mechanism is made to have a skip preventing function for ensuring that the first lever is pivotally returned stepwise.

12 Claims, 4 Drawing Sheets

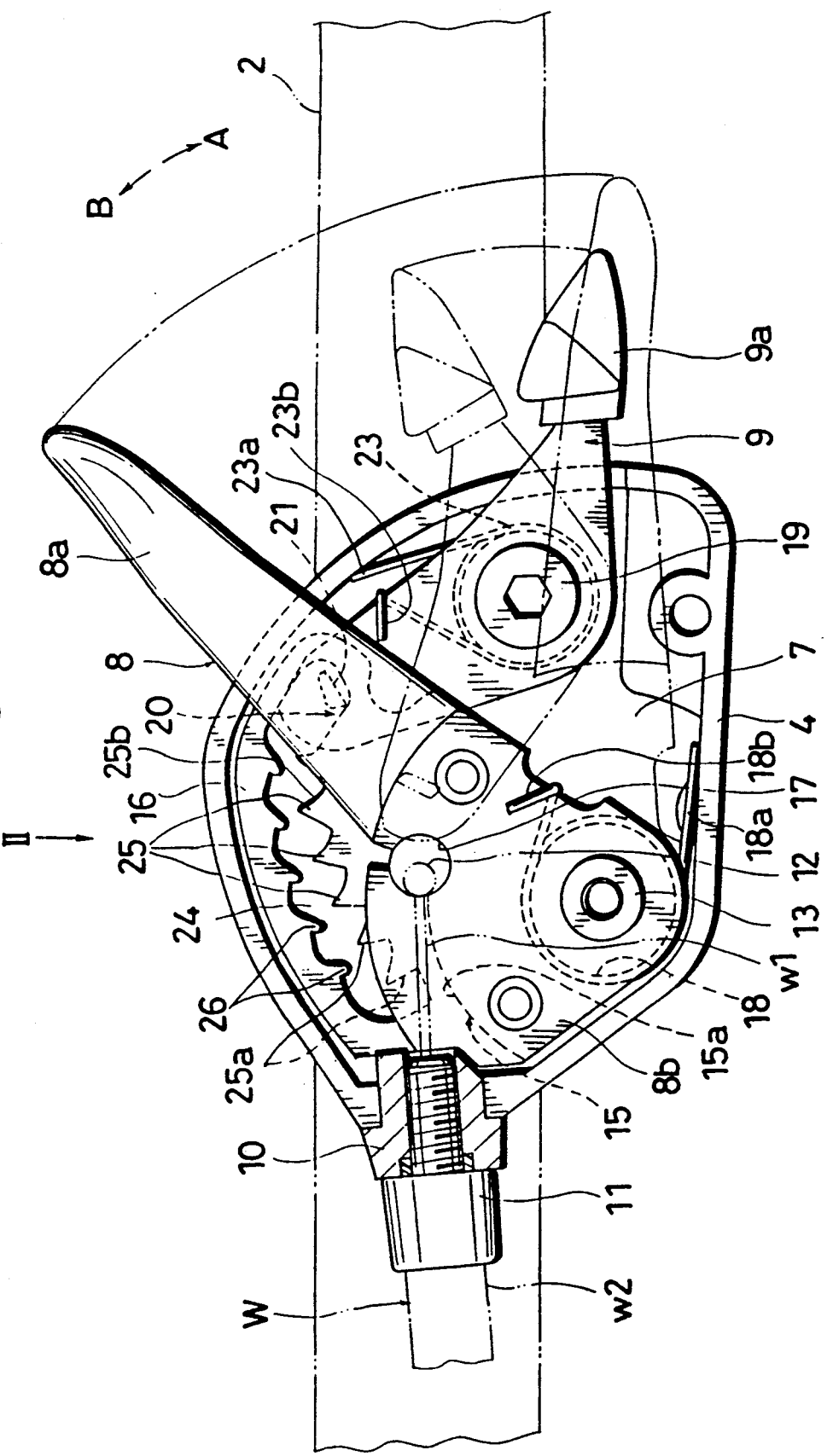

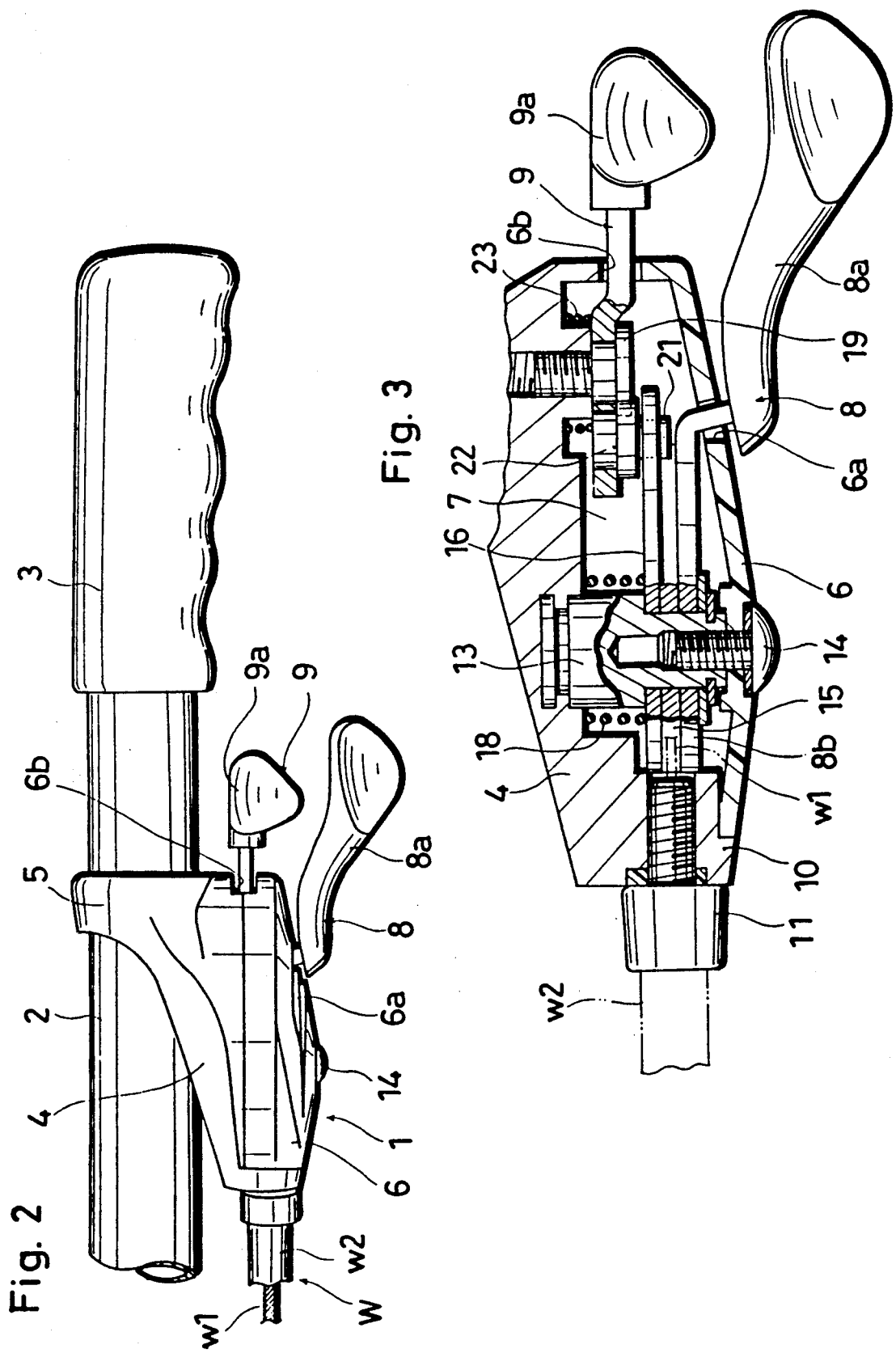

BICYCLE SPEED CHANGE LEVER ASSEMBLY

BACKGROUND OF THE INVENTION

1. Field of the Invention

This invention relates generally to a speed change lever assembly which is used for displacing a front or rear derailleur relative to a multiple sprocket. More particularly, the present invention concerns a speed change lever assembly of the type wherein pressing of one lever causes the derailleur to move in one direction, whereas pressing of another lever causes the derailleur to move in the opposite direction.

2. Description of the Prior Art

As is well known, a bicycle speed change system comprises a derailleur mounted adjacent a front or rear gear (multiple sprocket) for movement axially of the gear, and a lever assembly mounted on a suitable portion of a bicycle frame or handlebar and connected to the derailleur by means of a control cable. The lever assembly is operated to displace the derailleur relative to the gear, thereby shifting the chain from one sprocket to another of the gear for speed change.

A typical speed change lever assembly includes a single lever pivotally supported at its boss portion on a fixed shaft. The boss portion of the lever works also as a cable winder connected to one end of a control cable whose other end is connected to a derailleur. When the lever is pivoted in one direction, the control cable is wound up on the lever boss portion against a tension applied to the cable by a return spring which is incorporated in the derailleur. When the lever is pivoted in the opposite direction, the cable is paid out from the lever boss portion under the tension of the return spring. Such cable movements are transmitted to the derailleur for movement thereof relative to a front or rear gear, thereby performing an intended chain shift.

With the lever assembly described above, the lever has to be pressed and pulled respectively for winding up and paying out the cable. Therefore, it is necessary for the cyclist to use two different kinds of finger movements for operating the lever in the two pivotal directions. Thus, the operability of the typical lever assembly is relatively poor. Such poor operability becomes particularly problematic when the lever provides a large pivotal angle.

In an attempt to solve the above problem, there has been proposed to use a double lever assembly, as disclosed for example in Japanese Patent Publication No. 55-20909 (Published: June 5, 1980; Applicant: Bridgestone Cycle Co., Ltd.; Inventor: Kunitoshi KOSAKAI) or Japanese Utility Model Publication No. 59-43191 (Published: Dec. 20, 1984; Applicant: Shimano Industrial Co., Ltd.; Inventor: Keizo SHIMANO). Specifically, the double lever assembly comprises a pair of levers pivotally supported on a common pivot shaft respectively on both sides of a fixed plate. The fixed plate has a retaining hole for holding a ball whose diameter is slightly larger than the wall thickness of the fixed plate, so that the ball is partially projectable from the retaining hole on either side of the plate. One lever (first lever) is connected to a control cable under a tension, and formed with a positioning hole which disengages from the ball in its first pivotal limit position (cable pay-out position) but engages with the ball in its second pivotal limit position (cable winding position). The other lever (second lever) is also formed with a positioning hole which engages with the ball in its first pivotal limit position but disengages from the ball in its second pivotal limit position. Both levers are always urged toward their respective first pivotal limit positions by the tension of the control cable and/or a separate spring.

In operation, when the first lever assumes its first limit position with the positioning hole thereof disengaging from the ball, the second lever is held in its first limit position by the ball engaging with the positioning hole thereof. In this condition, the control cable is fully paid out from the first lever. When the first lever is pivoted to its second limit position to fully wind up the control cable, the ball comes into engagement with the positioning hole of the first lever but disengages from the positioning hole of the second lever, so that the second lever is pivoted by the urging force of the spring to its second limit position which substantially corresponds to the first limit position of the first lever. On the other hand, when the second lever is pressed to its first limit position, the ball comes into engagement with the positioning hole of the second lever lever but disengages from the positioning hole of the first lever, so that the first lever is pivoted to its first limit position by the tension of the control cable.

In this way, the double lever assembly is capable of shifting up and down only by pressing either one of the two levers. However, such a lever assembly is disadvantageous in the following respects.

First, each of the levers can take only two limit positions, so that the prior art double lever assembly is not capable of selecting three or more speeds. Second, the pivotal movement (returning movement) of the first lever from its second position to its first position is initiated only after the second lever has been completely pivoted to its first position. Thus, the pivotal pressing operation of the second lever does not cause the control cable to be immediately paid out from the first lever. In other words, the prior art double lever assembly fails to provide a quick operating response at least with respect to the cable pay-out operation.

Japanese Utility Model Application Laid-open No. 60-149485 (Laid-open: Oct. 4, 1985; Applicant: Maeda Industries, Ltd.; Inventor: Nobuo OZAKI) discloses an improved lever assembly which comprises a first pivotal lever, a second pivotal lever, and an indexing mechanism provided between the first and second levers. The first lever is connected to one end of a control cable and pivotally urged in a cable pay-out direction by a tension applied to the control cable as well as by a spring. The second lever is urged by the above-mentioned spring in the same pivotal direction as the first lever.

The indexing mechanism of OZAKI includes an engaging member carried by the second lever, and an indexing track carried by the first lever and held in contact with the engaging member by the urging force of the spring. The indexing track has a series of stopper steps which successively come into stopping engagement with the engaging member when the first lever is pivoted in a cable winding direction against the cable tension. The engaging member is disengageable from the stopper steps to allow pivotal movement of the first lever in the cable pay-out direction when the second lever is pivoted against the urging force of the spring.

Thus, the OZAKI's lever assembly is capable of providing any desired number of selectable speeds by suitably selecting the number of the stopper steps. However, the OZAKI's lever assembly is disadvantageous in the following point.

In the OZAKI's lever assembly, the first lever is always urged in the cable pay-out direction by the cable tension and the spring force, and only the engagement of the engaging member with the stopper steps of the indexing track prevents the first lever from pivoting in the cable pay-out direction. Thus, if the second lever is improperly pressed to such an extent that the engaging member is brought too much away from the indexing track (the stopper steps), the first lever having been once pivoted maximally in the cable winding direction will be pivoted fully in the cable pay-out direction by skipping the interim stopper steps, consequently failing to achieve an intended speed change. Therefore, it is necessary to carefully operate the second lever in order to ensure that the first lever is pivoted stepwise in the cable pay-out direction.

SUMMARY OF THE INVENTION

It is, therefore, an object of the present invention to provide a bicycle speed change lever assembly which enables shift-up and shift-down only by a lever pressing operation while providing the capability of reliably selecting three or more speeds both in shifting up and down.

Another object of the present invention is to provide a speed change lever assembly wherein a lever pivoting operation is facilitated.

According to the present invention, there is provided a bicycle speed change lever assembly comprising: a first lever pivotally supported by a first pivot shaft, the first lever being connected to one end of a control cable and pivotally urged in a cable pay-out direction at least by a tension applied to the control cable; a second lever pivotally supported by a second pivot shaft which is displaced from the first pivot shaft but extends in parallel thereto, the second lever being urged by a spring in the same pivotal direction as the first lever; and an indexing mechanism including an engaging member carried by the second lever, and an indexing track carried by the first lever and held in contact with the engaging member by the urging force of the spring, the indexing track having a series of stopper steps which successively come into stopping engagement with the engaging member when the first lever is pivoted in a cable winding direction against the tension of the cable, the engaging member being disengageable from the stopper steps to allow pivotal movement of the first lever in the cable pay-out direction when the second lever is pivoted against the urging force of the spring; wherein the indexing mechanism further comprises skip preventing means for ensuring that the first lever is pivoted in the cable pay-out direction step-by-step when the second lever is pivoted against the urging force of the spring.

Other objects, features and advantages of the present invention will be fully understood from the following detailed description given with reference to the accompanying drawings.

BRIEF DESCRIPTION OF THE DRAWINGS

FIG. 1 is a view showing a speed change lever assembly according to an embodiment of the present invention as mounted to a bicycle handlebar, wherein a cover member of the lever assembly is removed to show the interior structure thereof;

FIG. 2 is a view, in a reduced scale, of the same lever assembly as seen in the direction of an arrow II in FIG. 1;

FIG. 3 is a sectional view of the same lever assembly;

DETAILED DESCRIPTION

Figure 4:
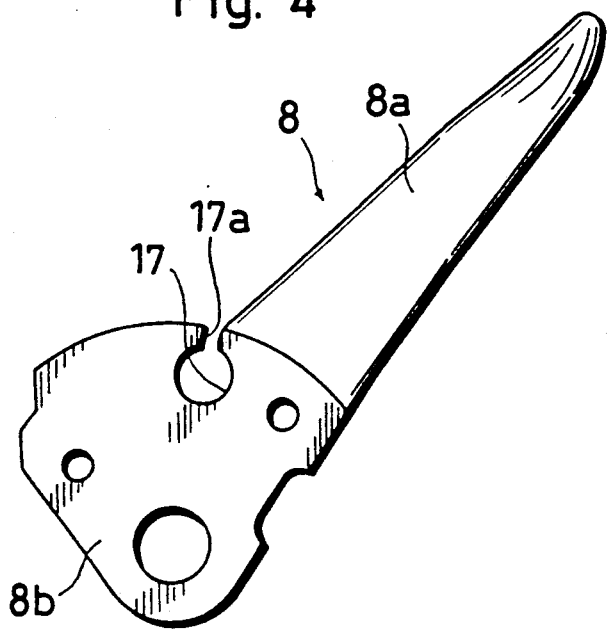
FIG. 4 is a front view showing a first lever incorporated into the lever assembly.

Referring now to FIGS. 1 to 3 of the accompanying drawings, there is shown a speed change lever assembly 1 as mounted to a bicycle handlebar 2 adjacent to its right hand grip portion 3 (FIG. 2). The lever assembly is connected to a remote front or rear deraileur (not shown) by means of a double control cable W which includes an inner wire w1 and an outer sheath w2 enclosing the inner wire.

The lever assembly 1 comprises a base member 4. According to the illustrated embodiment, the base member is integrally formed with a clamp band 5 (FIG. 2) which is used for mounting the lever assembly to the handlebar 2. A cover member 6 is fixed to the base member to define a mounting space 7 (see FIGS. 1 and 3) between these two parts.

The lever assembly 1 further comprises a first lever 8 and a second lever 9. These two levers are partially located within the mounting space 7, but project outward through respective slits 6a, 6b of the cover member 6 (see particularly FIG. 3) to provide respective presser portions 8a, 9a. The respective slits are so sized as to allow intended pivotal movement of the corresponding levers.

Preferably, the lever assembly 1 is mounted in such a way that the presser portions 8a, 9a of the respective levers 8, 9 are located below the handlebar 2 adjacent the grip portion 3. Such mounting is advantageous because the rider can bring his or her thumb to the respective lever presser portions 8a, 9a for operation thereof without substantially changing the gripping condition.

The base member 4 has a cable introducing portion 10 on the side away from the lever presser portions 8a, 9a. One end of the outer sheath w2 is received by a cable stopper 11 which is screwed in the cable introducing portion. On the other hand, one end of the inner wire w1 extends through the cable stopper 11 into the mounting space 7 of the lever assembly, and is provided with an anchoring nipple 12 (FIG. 1).

The first lever 8 has an enlarged base plate portion 8b which is pivotally supported by a first pivot shaft 13 within the mounting space 7 of the lever assembly. According to the illustrated embodiment, the base plate portion is generally sector-shaped, as best shown in FIG. 4. Preferably, the first pivot shaft is incorporated as an insert into the base member 4 when molding the latter. Indicated at 14 is a set screw engaging into the first pivot shaft for fixing the cover member 6 to the base member.

Figure 5:
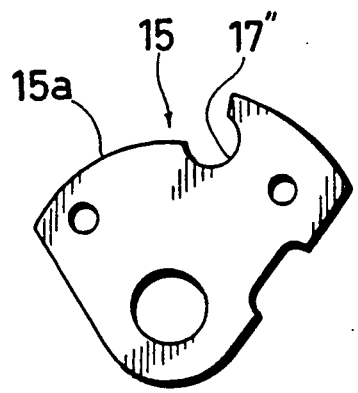
FIG. 5 is a front view showing a winding plate incorporated into the lever assembly.

Also pivotally supported on the first pivot shaft 13 is a winding plate 15 which is generally sector-shaped according to the illustrated embodiment, as shown in FIG. 5. The winding plate 15 is overlapped on the base plate portion 8b of the first lever 8 in a manner such that the winding plate is co-pivotable with the first lever. For this purpose, the winding plate may be riveted to the base plate portion of the first lever.

Figure 6A:
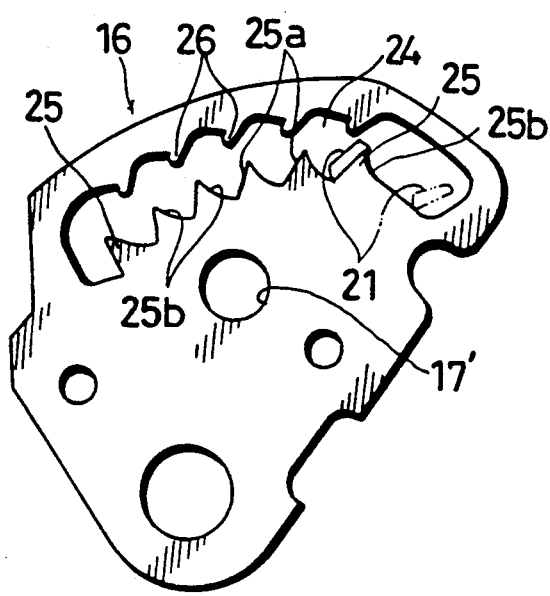
FIGS. 6a and 6b are front views showing an index plate of the lever assembly in different pivotal positions.
Figure 6B:
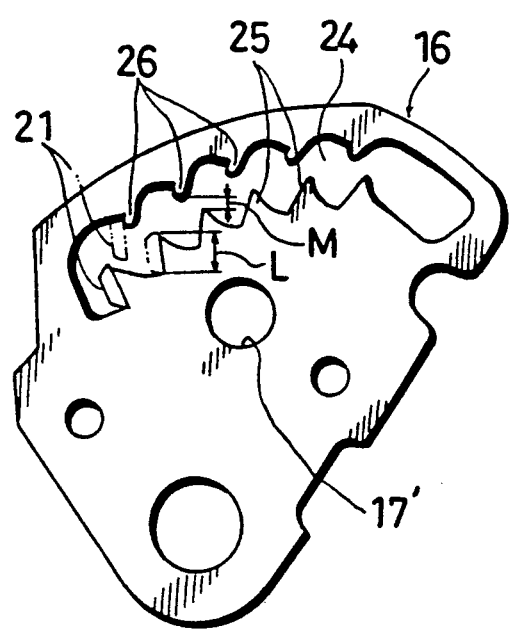

Further pivotally supported on the first pivot shaft 13 is an index plate 16 which is also generally sector-shaped, as shown in FIGS. 6a and 6b. The index plate is overlapped on the winding plate 15, so that the winding plate is sandwiched between the index plate and the base plate portion 8b of the first lever 8. The index plate may be riveted to the lever base plate portion together with the winding plate, so that these three plates are simultaneously pivotable about the first pivot shaft 13.

As understood from FIG. 1, the winding plate 15 is smaller than the index plate 16 and the base plate portion 8b of the first lever 8, and has an arcuate winding edge 15a (see also FIG. 5). The portion of the inner wire w1 introduced into the mounting space 7 of the lever assembly 1 extends between the index plate and the lever base plate portion to be guided by the winding edge of the winding plate, as shown in FIGS. 1 and 3.

The base plate portion 8b of the first lever 8 and the index plate 16 are respectively formed with engaging bores 17, 17' for engagement with the end anchoring nipple 12 of the inner wire w1 (see FIGS. 1, 4, 6a and 6b), whereas the winding plate 15 is formed with a corresponding cutout 17" (see FIG. 5). The nipple is inserted laterally into the engaging bores 17, 17' from the side of the lever base plate portion 8b. The lever base plate portion is further formed with a wire introduction cutout 17a in continuity with the engaging bore 17, so that the inner wire w1 may be brought to its proper position relative to the winding plate 15 in spite of such lateral insertion of the end anchoring nipple 12.

When the first lever 8 is pivoted, the inner wire w1 of the control cable is wound up onto or paid out from the winding edge 15a of the winding plate 15. It should be appreciated that the inner wire is always kept under tension applied by a return spring (not shown) which is incorporated into the front or rear deraileur (also not shown). Thus, the first lever is always urged in the cable pay-out direction indicated by an arrow B in FIG. 1.

Preferably, the first lever 8 is urged in the cable pay-out direction B also by means of a first coil spring 18 arranged on the first pivot shaft 13 between the index plate 16 and the base member 4, as shown in FIGS. 1 and 3. The coil spring has one end 18a engaging with the base member (see FIG. 1), whereas the other end 18b of the coil spring engages with the first lever 8. Thus, the first lever can be pivoted in the cable-pay out direction even if the frictional resistance between the inner wire w1 and the outer sheath w2 increases unacceptably for some reason (unjustifiable bending of the control cable W for example) to prohibit proper transmission of the cable tension.

According to the illustrated embodiment, the second lever 9 is in the form of a bell crank which is pivotally supported at an intermediate portion thereof by a second pivot shaft 19 removably screwed into the base member 4. The second pivot shaft is parallel to the first pivot shaft 13 and located farther from the cable introducing portion 10 of the base member than the first pivot shaft.

According to the present invention, there is provided an indexing mechanism 20 (see FIG. 1) which enables stepwise or indexing pivotal movement of the first lever 8 while also allowing the first lever to be held at any selected pivotal position thereof. The details of this indexing mechanism is now described.

The indexing mechanism 20 illustrated in FIGS. 1 and 3 comprises an engaging piece 21 which is an integral part of a follower pin 22 fixed to a free end of the second lever 9 opposite the presser portion 9a thereof. The engaging piece 21 is generally trapezoidal in cross section, as shown in FIG. 1.

The second lever 9 is always urged in the arrow B direction by means of a second coil spring 23. This spring has one end 23a engaging with the base member 4, whereas the other end 23b of the spring engages with the second lever.

The illustrated indexing mechanism 20 further comprises an indexing slot 24 formed in the index plate 16 for receiving the engaging piece 21. Thus, the first lever 8 is indirectly connected to the second lever 9 by the combination of the indexing slot 24 and the engaging piece 21.

The indexing slot 24 extends along a generally arcuate path, and has a radially inner edge formed with a series of stepping teeth 25. These teeth provide stopper faces 25a which come into stopping contact with the engaging piece 21, as shown in FIGS. 6a and 6b. The teeth further provide transient sliding faces 25b alternate with the stopper faces 25a for coming into sliding contact with the engaging piece 21 when the engaging piece shifts from one tooth to another.

Preferably, the indexing slot 24 becomes progressively closer to the first pivot shaft 13 as it approaches the cable introducing portion 10 of the base member 4 (see FIG. 1). Thus, when the first lever 8 is pivoted stepwise in the cable winding direction A, the engaging piece 21 is displaced radially inward, causing the second lever 9 to pivot in the arrow B direction toward a rider's thumb (not shown). Such pivotal movement of the second lever is advantageous in facilitating subsequent pressing of that lever.

The indexing slot 24 further has a radially outer edge formed with a series of skip preventing projections 26 arranged in staggered relation to the stepping teeth 25. As shown in FIG. 6b, the radial interval M between each skip preventing projection and its nearest stepping tooth is set smaller than the width L of the engaging piece 21. The purpose of such interval setting will be described hereinafter. Further, the skip preventing projection is inclined toward the cable introducing portion 10 of the base member 4. The purpose of such orientation will also be described hereinafter.

The operation of the speed change lever assembly 1 having the above structure is now described in detail.

It is now supposed that the first lever 8 takes its first pivotal position (solid line position) shown in FIG. 1. In this position, the inner wire w1 of the double control cable W is maximally paid out, and the second lever 9 also takes its first position (solid line position) wherein it is maximally away from the first lever. Because of the urging force imparted by the second coil spring 23, the engaging piece 21 carried by the second lever is pressed against a first sliding face 25b of the indexing slot 24 which is located farthest from the cable introducing portion 10 of the base member 4.

When the first lever 8 is pivoted in the cable winding direction A to wind up the inner wire w1 onto the winding plate 15 against the tension applied thereto, the index plate 16 also pivots in the same direction, causing the engaging piece 21 to slide on the first sliding face 25b. Upon passing the apex of the nearest stepping tooth 25, the engaging piece is abruptly displaced radially inward by the urging force of the second coil spring 23 for locking engagement with the stopper face 25a of that tooth, as shown in FIG. 6a. Thus, the first lever 8 is prevented from unintentionally returning to its first position even if the first lever is freed from a manual operating force. It should be appreciated that abrupt radial displacement of the engaging piece 21 produces a clicking sound or feel to notify that the first lever has been properly pivoted through a predetermined angle.

When the first lever 8 is pivoted further in the cable winding direction A, the engaging piece 21 slides on the next sliding face 25b and then engages with the next stopper face 25a in the same manner as described above. The same operation may be repeated until the engaging piece comes into locking engagement with the last (sixth) stepping tooth 25, as shown in FIG. 6b. In this condition, the first and second levers assume their respective phantom line positions shown in FIG. 1. As appreciated, the second lever has been pivoted in the arrow B direction because the indexing slot 24 becomes closer to the first pivot shaft 13 as it extends toward the cable introducing portion 10 of the base member 4.

For pivotally returning the first lever 8, the second lever 8 instead of the first lever itself is manually pivoted in the arrow A direction against the biasing force of the second coil spring 23. As a result, the engaging piece 21 is forcibly displaced radially outward to disengage from the stopper face 25a of the last stepping tooth 25, and the index plate 16 together with the first lever 8 is immediately pivoted in the cable pay-out direction B by the tension of the inner wire w1 combined with the urging force of the first coil spring 18. However, the nearest skip preventing projection 26 comes into stopping engagement with the engaging piece 21, and temporarily limits further pivoting of the index plate 16 (the first lever 8), as shown in FIG. 6b. Upon liberating the second lever, the engaging piece is displaced radially inward by the restoring force of the second coil spring to disengage from the previous projection 26, allowing further pivotal movement of the index plate (the first lever). Thus, as also shown in FIG. 6b, the engaging piece engages with the next stepping tooth 25 and thereby holds the first lever at the next pivotal position.

As already described, the width L of the engaging piece 21 is larger than the radial interval M between each stepping tooth 25 and its nearest skip preventing projection 26. As a result, the engaging piece must engage with either one of the stepping tooth and the skip preventing projection when the index plate 16 is pivotally moved together with the first lever 8, and it is only after engagement with the stepping tooth that the engaging piece can clear the relevant skip preventing projection. Therefore, no skipping occurs even when the second lever 9 is improperly pressed for returning the first lever 8.

A similar operation may be repeated until the first lever 8 is completely returned to the solid line position shown in FIG. 1. In so doing, since the skip preventing projections 26 are inclined toward the cable introducing portion 10 of the base member 4, the engaging piece 21 can be smoothly brought behind each previous projection by radially outward displacement thereof for engagement with the next projection.

According to the present invention, it is possible to wind up and pay out the inner wire w1 of the control cable W only by pressing either one of the first and second levers 8, 9 without any necessity of pulling these levers. Therefore, the lever assembly of the present invention can be operated very easily. Further, it is of particular significance that the first lever can be reliably returned stepwise even if the second lever is improperly pressed.

Figure 7:
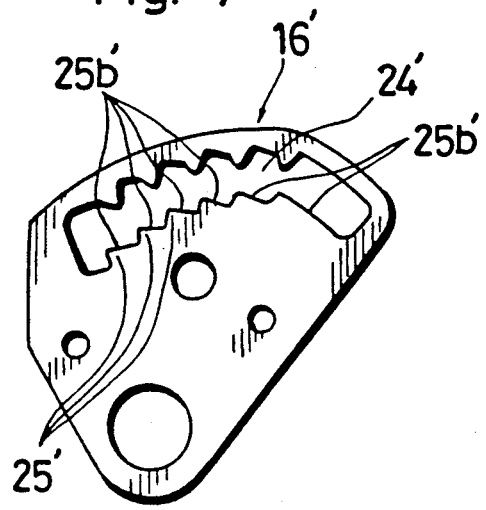
FIG. 7 is a front view showing a modified index plate which may be incorporated in the lever assembly.

FIG. 7 shows a modified index plate 16' which has a generally arcuate indexing slot 24'. This indexing slot has a radially inner edge formed with a series of stepping teeth 25' providing transient sliding faces 25b' which are arcuate about the first pivot shaft 13 (see FIG. 1).

Figure 8:
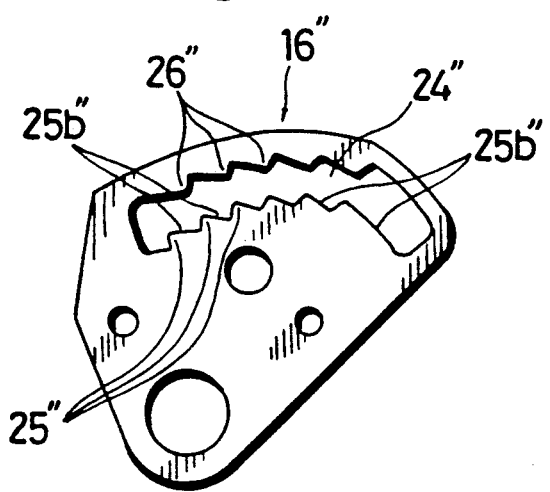
FIG. 8 is a front view showing another modified index plate.

FIG. 8 shows another modified index plate 16" which also has a generally arcuate indexing slot 24". Like the modification of FIG. 7, this indexing slot has a radially inner edge formed with a series of stepping teeth 25" providing transient sliding faces 25b" which are arcuate. Further, the indexing slot has a radially outer edge which is shaped substantially in the same way as the radially inner edge to provide a series of skip preventing projections or teeth 26" in staggered relation to the stepping teeth 25".

According to the modification of FIG. 8, each skip preventing projection 26" comes into sliding contact (but not stopping engagement) with the engaging piece 21 (see FIGS. 6a and 6b) to direct it toward the nearest stepping tooth 25" for engagement therewith. By continuing to press the second lever 9 (see FIG. 1), it is possible to quickly return the first lever to its initial pivotal position if so desired. However, it should be appreciated that no skipping occurs even in such use because a click sound or feel is generated at each stepping tooth 25" or skip preventing projection 26".

Obviously, the illustrated indexing slot 24 (24', 24") may be replaced by an indexing groove. Further, the indexing slot or track may extend along a path which is exactly arcuate about the first pivot shaft 13 to have a constant distance from the first pivot shaft. Alternatively, the indexing slot or track may extend in such a way that it becomes farther from the first pivot shaft as it extends toward the cable introducing portion 10 of the base member.

According to the illustrated embodiments, the indexing slot or track 24 (24', 24") is provided with the stepping teeth 25 (25', 25") as well as the skip preventing projections 26 (26"). However, the indexing slot may be provided only with the stepping teeth or equivalent, whereas the skip preventing projections or equivalent may be provided separately away from the indexing slot. In this case, the engaging piece 21 carried by the second lever cooperates only with the stepping teeth, and a separate engaging member must be provided on the second lever at another portion thereof suitable for cooperating with the skip preventing projections.

The present invention being thus described, it is obvious that the same may be varied in many other ways. For instance, the winding plate 15 and the index plate 16 (16', 16") may be made integral with the first lever. Further, the first coil spring 18 may be dispensed with because the first lever can be pivotally returned solely by the tension imparted to the inner wire w1. Such variations are not to be regarded as a departure from the spirit and scope of the present invention, and all such modifications as would be obvious to those skilled in the art are intended to be included within the scope of the following claims.

I claim:

1. A bicycle speed change lever assembly comprising:

a first lever pivotally supported by a first pivot shaft, said first lever being connected to one end of a control cable and pivotally urged in a cable pay-ut direction t least by a tension applied to said control cable;

a second lever pivotally supported by a second pivot shaft which is displaced from said first pivot shaft but extends in parallel thereto, said second lever being biased by an urging force of a spring in the same pivotal direction as said first lever; and an indexing mechanism including an engaging member carried by said second lever, and an indexing track carried by said first lever and held in contact with said engaging member by the urging force of said spring, said indexing track having a series of stopper steps which successively come into stopping engagement with said engaging member when said first lever is pivoted in a cable winding direction against the tension of said cable, said engaging member being disengageable from said stopper steps to allow pivotal movement of said first lever in said cable pay-out direction when said second lever is pivoted against the urging force of said spring; wherein said indexing mechanism further comprises skip preventing means for ensuring that said first lever is pivoted in said cable pay-out direction step-by-step when said second lever is pivoted against the urging force of said spring, wherein said indexing track is in the form of a generally arcuate slot which has a radially inner edge formed with a series of stopper faces and a series of transient sliding faces alternate with said stopper faces, said stopper faces serving as said stopper steps, said transient sliding faces coming into sliding contact with said engaging member when said first lever is pivoted in said cable winding direction.

2. The lever assembly as defined in claim 1, wherein said indexing track extends along a generally arcuate path, one end of said track being located farther from said first pivot shaft than the other end of said track so that when said first lever is pivoted in one direction, said second lever is pivoted in the opposite direction.

3. The lever assembly as defined in claim 1, wherein each transient sliding face of said slot is substantially arcuate about said first pivot shaft.

4. The lever assembly as defined in claim 1, wherein said skip preventing means comprises a series of skip preventing projections formed along a radially outer edge of said slot in staggered relation to said stopper steps, said skip preventing projections being engageable with said engaging member when said second lever is pivoted against said spring.

5. The lever assembly as defined in claim 4, wherein said engaging member has a width larger than a radial interval between each skip preventing projection and its nearest stopper step.

6. The lever assembly as defined in claim 5, wherein each skip preventing projection is shaped and oriented in a manner such that it comes into stopping engagement with said engaging member when said second lever is pivoted against said spring.

7. The lever assembly as defined in claim 5, wherein each skip preventing projection is shaped and oriented in a manner such that it comes into sliding contact with said engaging member for directing said engaging member toward a next stopper step when said second lever is pivoted against said spring.

8. The lever assembly as defined in claim 1, further comprising an index plate mounted on said first lever for pivoting therewith, said slot being formed in said index plate.

9. The lever assembly as defined in claim 1, wherein said first lever is pivotally urged in said cable pay-out direction by a spring.

10. The lever assembly as defined in claim 1, wherein said second lever is in the form of a bell crank pivotally supported at an intermediate portion on said second lever, one end of said bell crank providing a presser portion for manual operation, the other end of said bell crank carrying said engaging member.

11. The lever assembly as defined in claim 1, wherein said engaging member is a shaped piece integral with a pin which is mounted on said second lever.

12. The lever assembly as defined in claim 11, wherein said shaped piece is generally trapezoidal in cross section.

* * * * *